UNITED STATES PATENT OFFICE.

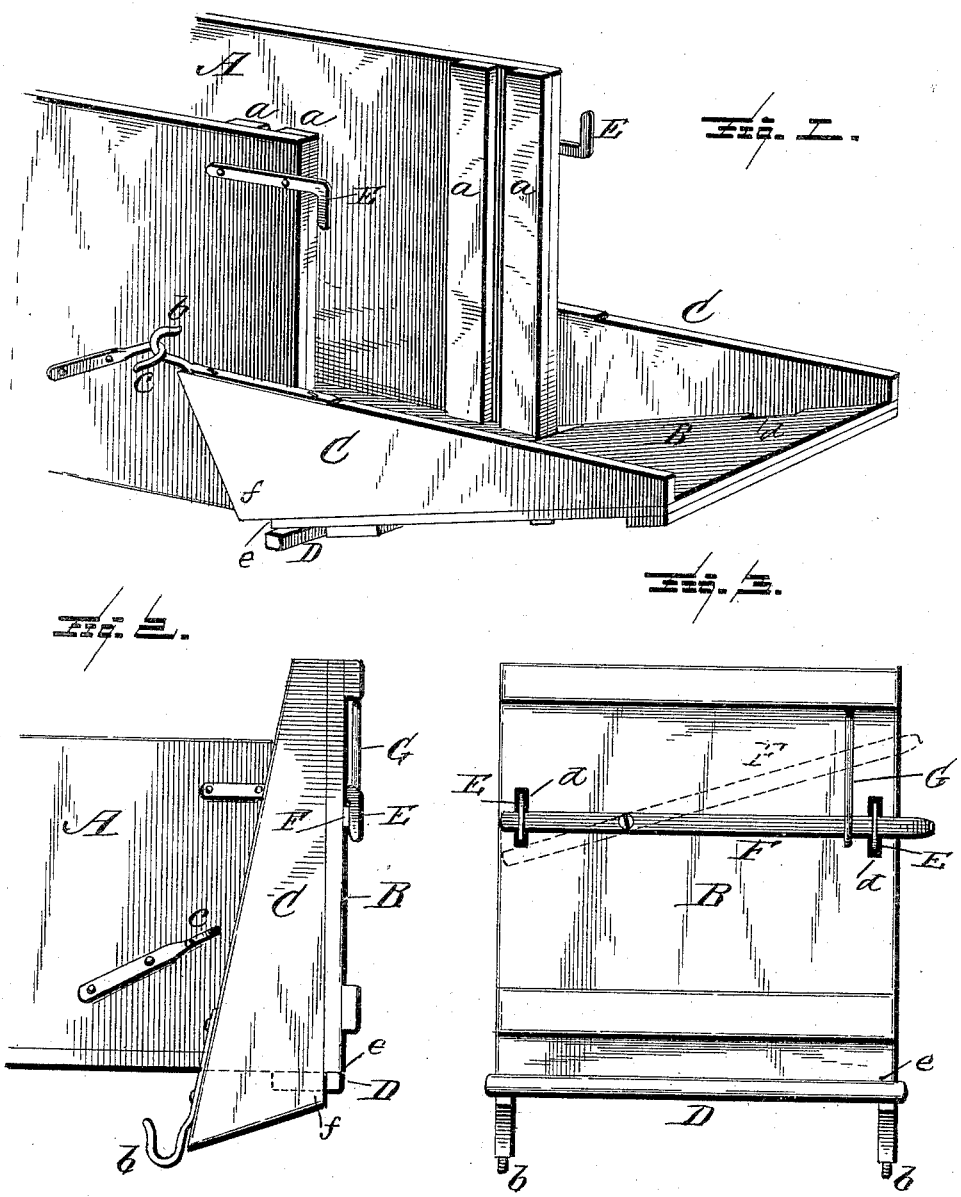

JAMES W. LESAN, OF BRADFORD, ILLINOIS.

WAGON END-GATE.

SPECIFICATION forming part of Letters Patent No. 443,099, dated December 23, 1890.

Application filed September 17, 1890. Serial No. 365,253. (No model.)

*To all whom it may concern:*

Be it known that I, JAMES W. LESAN, a citizen of the United States, residing at Bradford, in the county of Stark and State of Illinois, have invented certain new and useful Improvements in End-Gates for Wagons; and I do hereby declare that the following is a full, clear, and exact description of the same, reference being had to the annexed drawings, making a part of this specification, and to the letters of reference marked thereon.

Figure 1 of the drawings is a perspective view of my invention, showing the end-gate in position for use as a shoveling-board; Fig. 2, a side view showing the end-gate in position to close the end of the wagon, and Fig. 3 an end view thereof.

The present invention has relation to that class of end-gates for wagons in which the gate is held open by extending tongues at the inner or lower sides of the same, and adapted to rest upon supports projecting laterally from the sides of the wagon-body in connection with hooked rods engaging with the gate and body of the wagon, the rods also serving as a means for locking the gate closed by engagement with a spring upon the outer side thereof.

It is the object of the invention to dispense with these rods as a means for holding the gate open or extended and provide a more simple device for both holding the gate open or extended and locking it closed against the wagon-body, such means being substantially shown in the drawings, and hereinafter described and claimed.

In the accompanying drawings, A represents the body of a wagon of the ordinary construction and provided upon its inner sides with cleats $a$ for holding therein the ordinary end-gate when such gate is designed for use.

The end-gate B, when constructed in accordance with my invention, is provided with the sides C, preferably of tapering form, as shown, the sides C having at their inner ends suitable hooks $b$, so that when the gate is extended, as shown in Fig. 1, the hooks are made to engage with hooks $c$ upon the sides of the wagon-body. The hooks above described sustain the gate in the position shown, as does also the supporting-bar D, upon and against which the edge of the gate rests when extended.

The gate B has slots $d$ to receive the ends of hooks E when the gate is closed against the end of the wagon-body, as shown in Figs. 2 and 3, a pivoted locking-bar F engaging the hooks E when the latter extend through the slots, thereby securely locking the gate to the end of the wagon-body.

A guide G is provided for the bar F, through which the bar passes, and, as will be noticed, the sides C of the gate B extend down some distance beyond the same, as shown more clearly in Fig. 2, so that when the gate is closed the lower edge of the gate B, as shown at $e$, will rest upon the support D, and the extended portion $f$ of the sides C will abut against the inner side of the support, thereby bracing and firmly sustaining the gate when closed against the end of the wagon-body, as shown in Fig. 2. The ends of the support B extend beyond the sides of the wagon-body, as shown in Fig. 1, so that the sides C of the gate can act therewith in sustaining and bracing the gate, as above described.

Having now fully described my invention, what I claim as new, and desire to secure by Letters Patent, is—

The wagon-body provided with hooks $c$ and L-shaped hooks E, connected to the sides, as shown, the latter extending in opposite directions, and the support D, extending beyond the sides of the body, in combination with the detachable end-gate B, having its sides C extending longitudinally beyond the gate and provided at their outer edges with hooks $b$, the slots $d$, through which the hooks E pass when the gate is closed, and the pivoted locking-bar F, adapted to engage with said hooks, substantially as and for the purpose set forth.

In testimony that I claim the above I have hereunto subscribed my name in the presence of two witnesses.

JAMES W. LESAN.

Witnesses:
   AUGUSTUS S. THOMPSON,
   JAMES M. MORRIS.